United States Patent
Broselow

(10) Patent No.: US 10,607,052 B2
(45) Date of Patent: Mar. 31, 2020

(54) DYNAMIC DIGITAL DATA LOADING IN REAL TIME

(71) Applicant: James B. Broselow, Hickory, NC (US)

(72) Inventor: James B. Broselow, Hickory, NC (US)

( * ) Notice: Subject to any disclaimer, the term of this patent is extended or adjusted under 35 U.S.C. 154(b) by 0 days.

(21) Appl. No.: 16/186,904

(22) Filed: Nov. 12, 2018

(65) Prior Publication Data

US 2019/0303634 A1   Oct. 3, 2019

Related U.S. Application Data

(63) Continuation of application No. 15/939,764, filed on Mar. 29, 2018, now abandoned.

(51) Int. Cl.
*G06K 7/14* (2006.01)
*G06K 19/06* (2006.01)

(52) U.S. Cl.
CPC ......... *G06K 7/1417* (2013.01); *G06K 7/1413* (2013.01); *G06K 19/06028* (2013.01); *G06K 19/06037* (2013.01)

(58) Field of Classification Search
CPC .......... G06K 7/1417; G06K 19/06028; G06K 19/06037; G06K 7/1413
See application file for complete search history.

(56) References Cited

U.S. PATENT DOCUMENTS

| | | | |
|---|---|---|---|
| 8,215,565 B2 | 7/2012 | Howard | |
| 8,416,065 B2 | 4/2013 | Pasquero et al. | |
| 9,302,818 B2 * | 4/2016 | Beadles | B65D 27/06 |
| 2013/0173754 A1 | 7/2013 | van Os et al. | |
| 2014/0162596 A1 | 6/2014 | Adchan | |
| 2016/0106625 A1 * | 4/2016 | Dunleavy | A61J 7/0084 |
| | | | 206/534 |

\* cited by examiner

*Primary Examiner* — Seung H Lee
(74) *Attorney, Agent, or Firm* — Shumaker, Kendrick & Loop, LLP

(57) ABSTRACT

A computer-implemented method for providing the ability to store a message for later retrieval that includes the steps of preparing an object with a surface having a bar code and associating the bar code with a digital store on an Internet-accessible server. A first user scans the bar code to access the digital store and records a message into the digital store. The digital store can be scanned by either the same or another user to access the message in the digital store.

18 Claims, 5 Drawing Sheets

| |
|---|
| CREATE BAR CODE WITH OR WITHOUT TACTILE FEATURE |
| ASSOCIATE BAR CODE WITH INTERNET-ACCESSIBLE DIGITAL STORE |
| FIRST USER SCANS BAR CODE |
| DIGITAL STORE OPENS |
| FIRST USER RECORDS MESSAGE-VIDEO, AUDIO, TEXT OR COMBINATION TO DIGITAL STORE |
| BAR CODE SUPPLIED TO A SECOND USER |
| SECOND USER SCANS BAR CODE |
| DIGITAL STORE OPENS |
| SECOND USER RETRIEVES RECORDED MESSAGE FROM DIGITAL STORE |
| SECOND USER RECORDS MESSAGE-VIDEO, AUDIO, TEXT OR COMBINATION TO DIGITAL STORE |
| BAR CODE SUPPLIED TO A FIRST USER |
| REPEAT METHOD STEPS "N" TIMES |

FIG. 4

DYNAMIC DIGITAL DATA LOADING IN REAL TIME

CROSS-REFERENCE TO RELATED PATENT APPLICATIONS

This application is a continuation claiming priority to co-pending U.S. patent application Ser. No. 15/939,764, filed on Mar. 29, 2018, the entire contents of which are hereby incorporated by reference in their entirety.

TECHNICAL FIELD AND BACKGROUND OF THE INVENTION

This invention relates to a product and method for providing the ability to dynamically load digital data in real time that can be achieved by individuals with impaired capabilities, unsophisticated and children. The invention includes provision for a bar code, such as a QR code image, that includes a tactile feature, such as Braille, that permits a visually-impaired person to access and use features of the invention.

The product and method is "dynamic" because users can communicate back and forth using either audio or video using only a digital device such as a smart phone. The product and method is "real time" because of the ability to use bar codes, such as QR codes, with a digital device such as a smart phone to communicate by either adding to or overwriting previous messages via the QR code.

The establishment of the Internet along with unprecedented ability to store information has revolutionized the basic concept of a "message." Internet access is available as a matter of course in virtually every public and most private areas. Data storage has become very inexpensive and is thus, a commodity affordable to every business and to most individuals. Numerous methods of storing and accessing data have been developed and many more will be developed in the future.

As described below, the product and method according to the invention works "backwards" from previous messaging processes where a website is built containing information, and then bar codes are used to visit the website by directing the user to a URL where the information, already stored on the website, is accessed. In this application, data is dynamically transferred between individuals merely by scanning a QR code and then either recording an audio or video message.

Over 30 million Americans have visual impairment sufficient to interfere with their ability to read, which is particularly important with regards to issues such as medication safety. Medication instructions tend to be written in small font in an effort to include all of the possible indications, side effects, special instructions, and the like. A tactile feature of the invention optionally permits a visually-impaired user to use the system.

The features explained below contain unconventional and non-generic combination of elements. These limitations confine any abstract ideas to a particular, practical application of the ideas contained in this application, and as explained in the specification, the combination of limitations is not well-understood, conventional or routine activity. See, Dec. 15, 2016 USPTO publication and Bascom Global Internet v. AT&T Mobility LLC, 119 USPQ2d 1236 (Fed. Cir. 2016).

SUMMARY OF THE INVENTION

Therefore, it is an object of the invention to provide a product and method for providing the ability to dynamically load digital data in real time;

It is another object to provide a product and method that permits dynamically created information to be stored in real time in a single digital store in a manner that is readily retrievable.

It is another object to provide a product and method that enables individuals to dynamically load digital data in real time, including by individuals with impaired capabilities and children.

It is another object to provide a product and method that includes provision for a bar code, such as a QR code image to include a tactile feature, such as Braille, that permits a visually-impaired person to access and use features of the invention.

It is another object to provide a mobile app that allows the ability to receive recorded information from a bar code without the need to see the screen.

It is another object to provide a bar code sticker whose surface configuration can indicate the purpose of the bar code.

It is another object to provide a bar code with one or multiple perforations that correspond to one or more protrusions from the surface of a container.

It is another object to provide an editable bar code communication network.

It is another object to provide a digital system which allows uploading of a selected video recording to a predetermined web address.

It is another object to provide a QR code allowing access to a predetermined web address configured to upload, play and/or overwrite a video.

It is another object to provide a mobile app configured to scan to a URL, recognize an embedded video request, record a video or select a pre-recorded video from a media library, and forward the request to the pre-selected URL along with the recorded video recording.

It is another object to provide a mobile app that allows a selected user or users to replace a selected video with another video.

It is another object to provide a digital system which allows uploading of a selected audio recording to a predetermined web address.

It is another object to provide a QR code that allows access to the predetermined web address configured to upload, play and/or overwrite an audio recording.

It is another object to provide a mobile app configured to scan a URL, recognize an embedded audio request, record an audio message, and forward the request to a preselected URL along with the recorded audio message.

It is another object to provide a mobile app that allows a selected user or users to replace a selected video message with another video message.

It is another object to provide a communication network that includes identical bar codes whose digital content can be uploaded and edited in real time.

It is another object to provide a communication network that includes identical bar codes whose digital content can be uploaded and edited in real time and that can be edited by any user.

It is another object to provide a communication network that includes identical bar codes whose digital content can be uploaded and edited in real time and that can be edited only by the original source of the uploaded content.

BRIEF DESCRIPTION OF THE DRAWINGS

FIG. 4 is a flow chart that illustrates one implementation of the invention;

DETAILED DESCRIPTION OF PREFERRED EMBODIMENT AND BEST MODE

Figure 1:
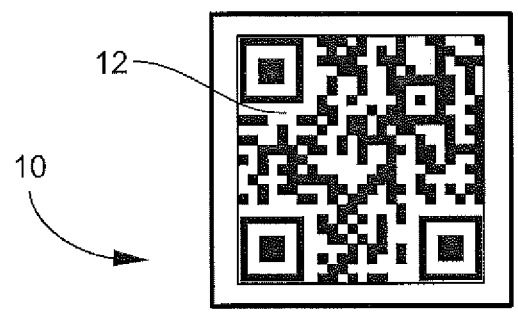
FIG. 1 illustrates a typical QR-type bar code.

Referring now to the drawings, FIG. 1 illustrates a sticker, for example, an adhesive sticker, 10 on which is printed a conventional QR bar code 12 suitable to enable the invention of this application to be practiced. Other bar codes such as UPC-A, EAN-8, EAN-13, code39, code128 and ITF bar codes are among other suitable bar codes. ("Image codes"). Scanning devices suitable for use include Honeywell, Android and Apple digital tablets, smart phones and laptops with scanning capability. The term sticker is used for purposes of illustration only. The bar code 12 can be printed onto any object capable of retaining the bar code image.

The system is accessible in multiple situations and with minimal cost associated with accessing the content. Other information, for example, a living will, contact information for next of kin and the like can also be entered as bar code data. An important factor is the dynamic, easily and quickly changeable nature of the system. Many data storage systems emphasize the need to centrally store vast amounts of data in a single location. This is important when the data must be accessed and, for example, analyzed to detect data trends across a population, That is not the purpose of this system. Rather, this system focuses on the individual user and the ability of that user to interact with a sole or limited number of other individuals, or for the user to store information for easy retrieval.

Among the most fundamental and valuable aspects of the Internet is the ability to store and then retrieve digital information. The standard process by which this takes place involves first building a website with a basic address, and then building out trees of sub-categories in order to store and retrieve related information. Then, bar codes connected to a predetermined part of the website are generated and forwarded to a user. Allowing an airline ticket purchaser to use a bar code to access flight information or for check-in are examples of this process. Especially for business purposes, the time and expense of establishing a web presence is considered well worth the effort. In addition, the ability to represent a URL as a bar code allows rapid access to virtually any URL in seconds.

There is, however, no present process which starts with a bar code that is created to already point at a unique URL, allowing an unsophisticated user to upload, store, and access digital information in seconds while bypassing the need for an additional web presence. In addition, building a communications network focusing on voice and video recording has the potential to greatly improve communications, especially if the physical location of the bar code is in the context of the need for specific types of information.

In general, the sticker 10 is created on which is printed a bar code 12 that is associated with a URL. In one embodiment, the URL points to an "empty" data store that is available only to the user of the specific bar code 12 and sticker 10. The user of the sticker 10 can scan the bar code 12 with a scan-enabled digital device, which connects to the empty data store via the Internet, see FIG. 2. Using, for example, an app resident on the scan-enabled digital device, the user is able to record into the data store a video, text or audio message. The sticker 10 and bar code 12 is then made available to a second user who by scanning the same sticker is able to access the message contained in the data store.

According to one embodiment, the second user can then either record over or add a message to the original message, which can then be scanned and accessed by the original user. This back-and-forth process can take place indefinitely until the data store is full, at which point a "write-over" begins.

By way of example, a parent can record a message for a child and then place the sticker 10 on a surface where it will be seen by the child. The child need only scan the sticker 10 to receive an audio or video message from the parent regarding homework, dinner, evening plans or any other subject. The child can return a message to the parent without typing or even being able to read a message.

In another example, military or civilian medics can provide immediate care to a wounded individual, scan a sticker 10, record a message indicating the location of wounds, the initial treatment provided, or any other useful information, and then place the sticker on an article of clothing, watch band, dog tag or other object so that the information regarding initial treatment goes with the patient to the next treatment location. With the scanner connected to a portable video camera such as a "Go Pro", a video of the actual initial treatment can be stored. When the patient arrives at the next treatment location the medical personnel need only scan the sticker 10 attached to the patient to be informed of what treatment has already been performed.

Another example enables service and utility providers to apply the bar code 12 to piping, HVAC units, fuse boxes, water heaters, cable boxes, water meters, utility poles, underground pipes, and other items and spaces that are inspected, serviced or monitored on real estate. A utility worker would be able to scan the bar code 12 and receive a message from a previous utility worker (or the property owner) detailing information that would be useful. Such information can be prior repairs, prior readings, and anything else that is useful to the utility worker. The utility worker could also record a new message with updated information for the next individual to scan the bar code 12.

Other examples include a birthday card to which the sticker 10 can be applied so that the card can be sent with a video of the family singing 'happy birthday', or a toy with a sticker 10 applied can allow the recipient child to hear a message from a deployed parent. Recorded messages for discharge instructions from a hospital, personalized messages on the back of business cards, voice or video messages attached to heirlooms, or albums that contain bar codes that allow the user to select from a library of videos the ones that they wish to display, for a specific age of a child, or a specific vacation.

Because the bar code 12 on the sticker 10 is inherently digital, a physical object need not be sent. The sticker 10 can be applied to a physical object and the object and the attached sticker 10 then can be photographed and forwarded by email, text message or other electronic transmission visual protocol to a recipient. The physical object, for example, a card, can be viewed and, by scanning the sticker 10, the personalized portion of the transmission can be accessed. Similarly, the recipient can then scan the sticker 10 shown in the photograph to access the data store and prepare a return message, as described above.

Figure 2:
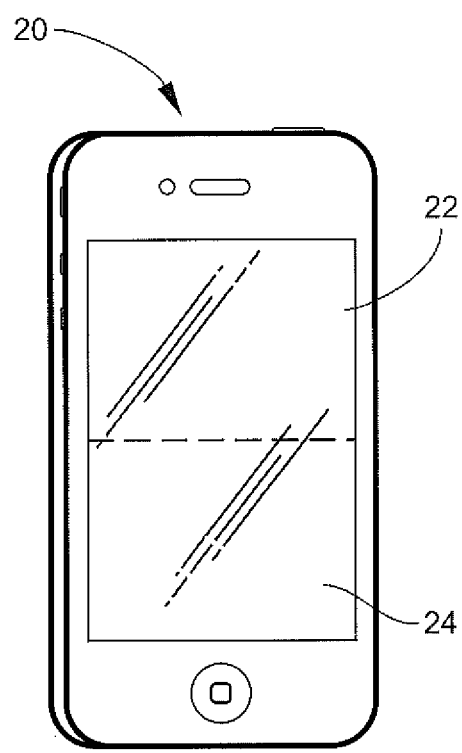
FIG. 2 is a perspective view of a smart phone screen optionally enabled for use by visually-impaired individuals.

As shown in FIG. 2, a smart digital device 20 is programmed via an app that divides the screen area into two touch zones, a scan zone 22 and a "play message" zone 24. A visually-impaired user can scan the sticker 10 by sensing by feel the screen area and pointing the device 20 at the sticker 20. To either record or play a message after scanning, the user need only touch the lower "play message" area 24 of the screen.

Figure 3:
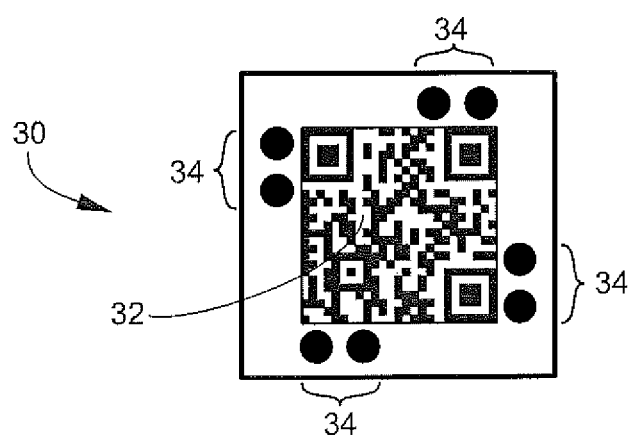
FIG. 3 illustrates a QR-type bar code that includes a tactile feature that allows visually-impaired individuals to access and use the QR bar code to load digital data in real time in accordance with the principles of the invention.

To further facilitate usage by the visually-impaired, FIG. 3 illustrates a sticker 30 that includes a bar code 32 and that additionally includes a tactile feature, such as standard Braille lettering 34. The letter "B", for example, is shown embossed onto the sticker 32 to signal the user that the sticker 32 is a special bar code 34 that can be scanned and used as described above.

Referring to FIG. 4, a flow chart illustrating the above principles is shown, and describes the process by which two users can exchange messages back-and-forth by scanning a bar code 12 and recording a message to be accessed by another individual scanning either the same sticker 10 or another sticker 10 having the same bar code 12.

Figure 5:
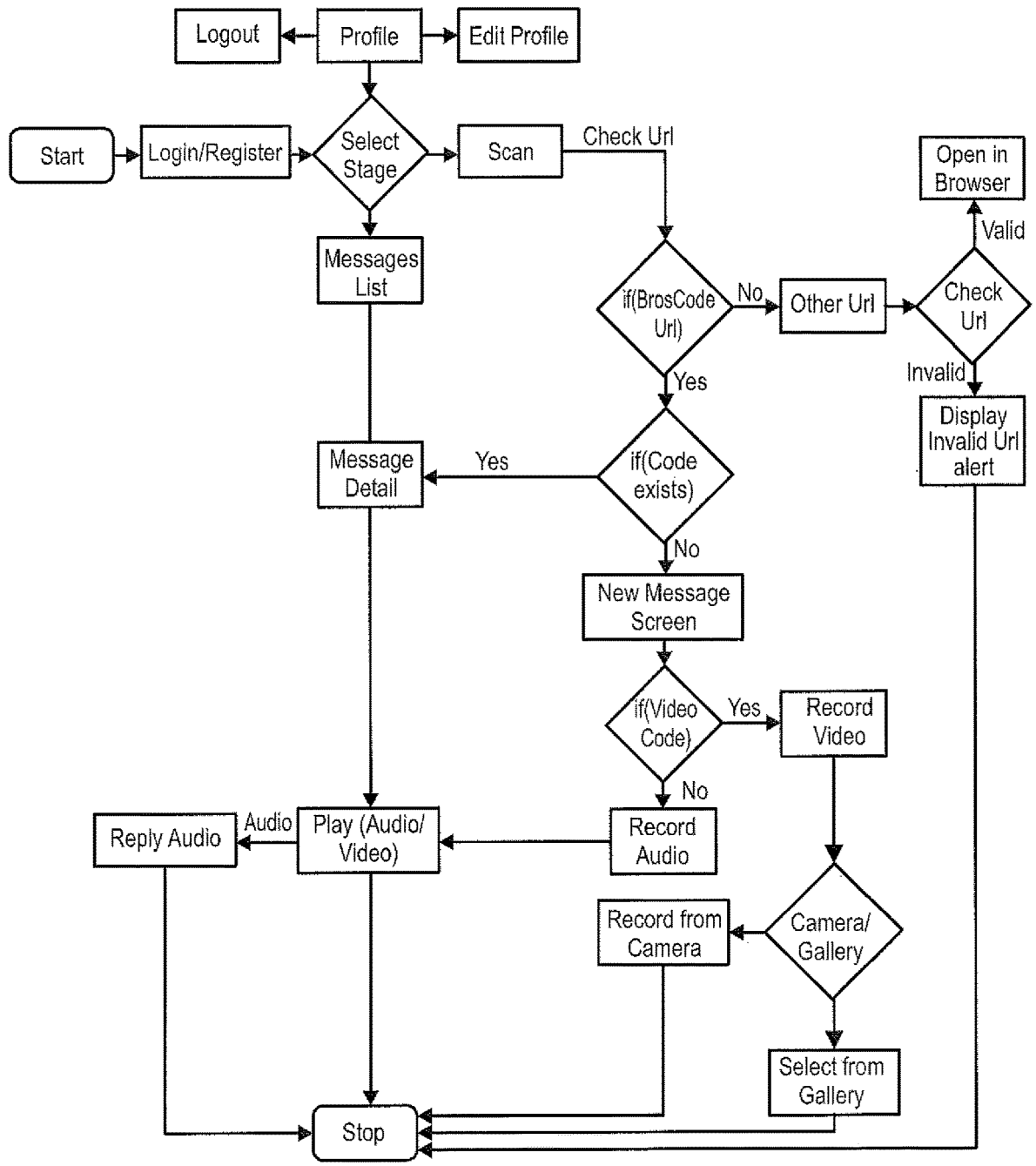
FIG. 5 is a flow diagram of a digital device application illustrating one implementation of the invention.

FIG. 5 is a flow diagram of a digital device application that illustrates the principles set out above in the context of an "app" that may be downloaded onto a digital device such as a smart phone or tablet.

Figure 6:
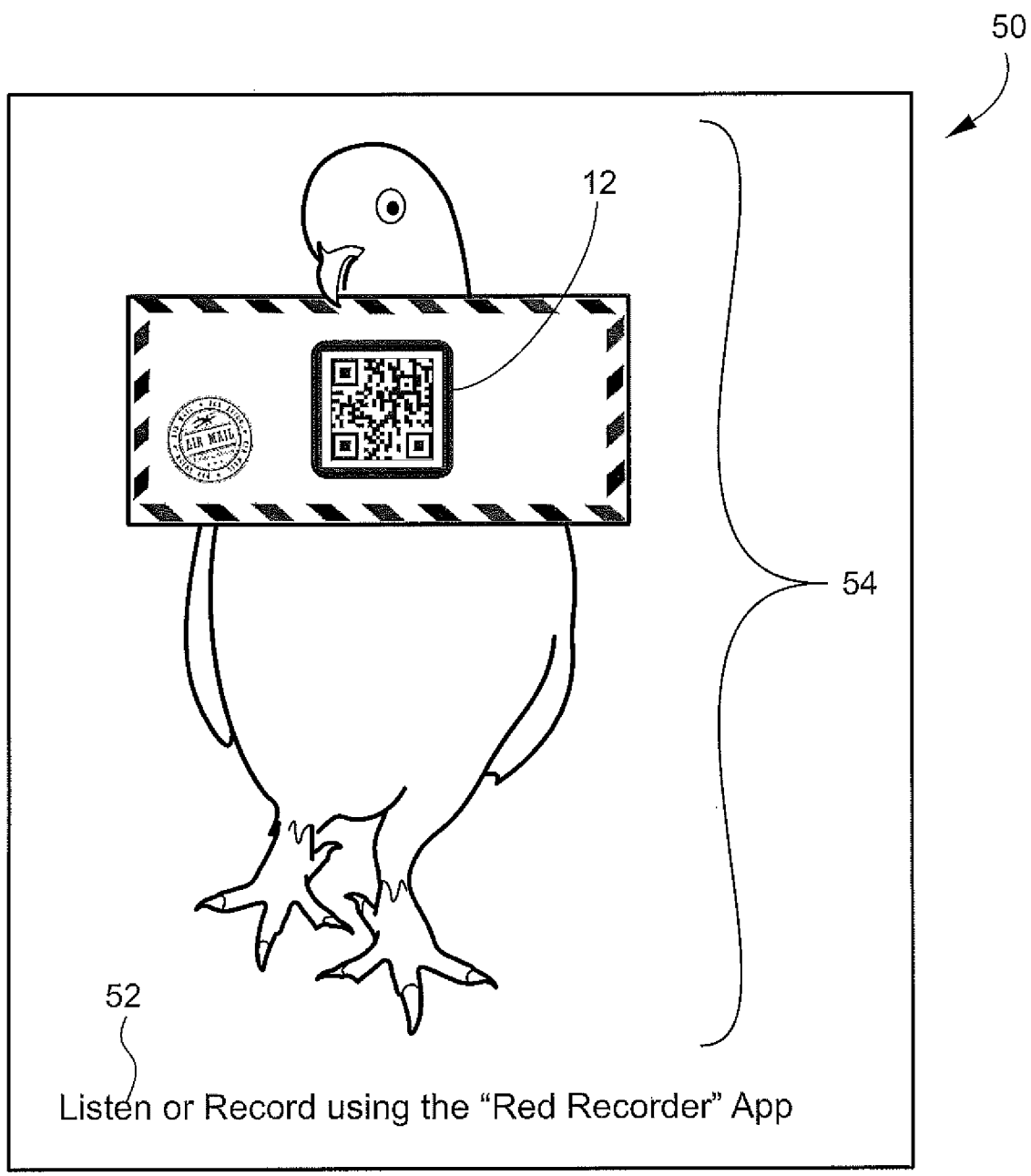
FIG. 6 illustrates a QR-type bar code on a decorative card.

FIG. 6 is an illustration of a parent-teacher communication card 50. In this exemplary embodiment, the bar code 12 is printed on a card 50 that has a decorative graphic 54 and simple instructions 52. A teacher is able to scan the bar code 12 and record a digital message for a parent. The card 50 can then be sent home with a child where the parent can scan the bar code 12 and receive the digital message. The parent can choose to record a new digital message and send the card 50 back to the teacher with the student. This process can continue as many times as the parent and teacher desire. For example the back and forth can continue for the duration of a school year.

Figure 7:
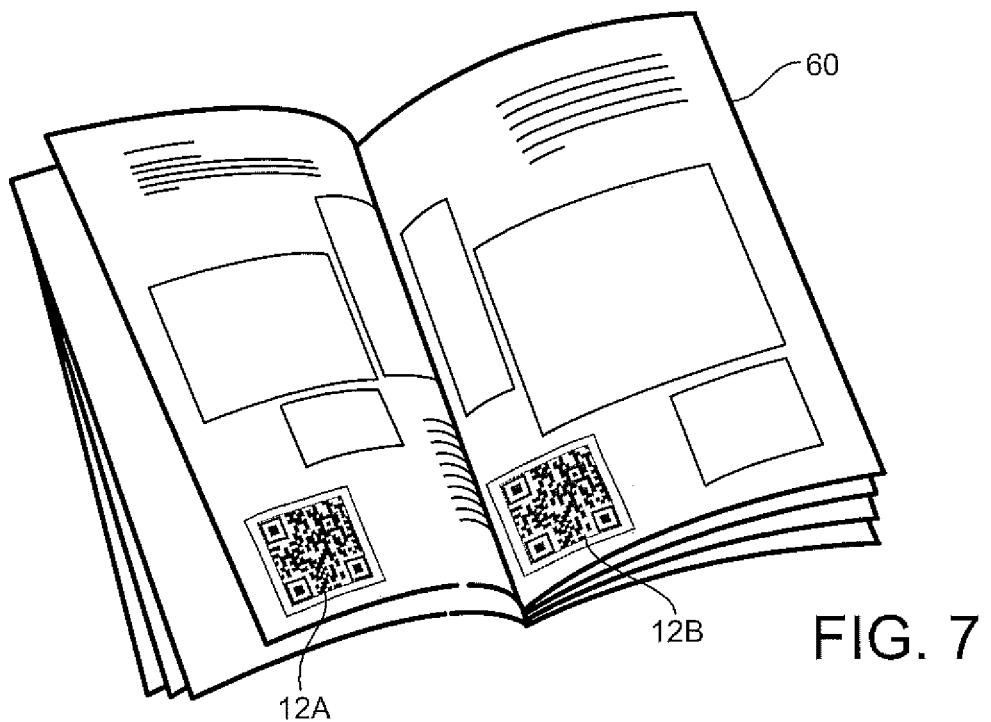
FIG. 7 illustrates a book with QR codes on each page enabled.
Figure 8:
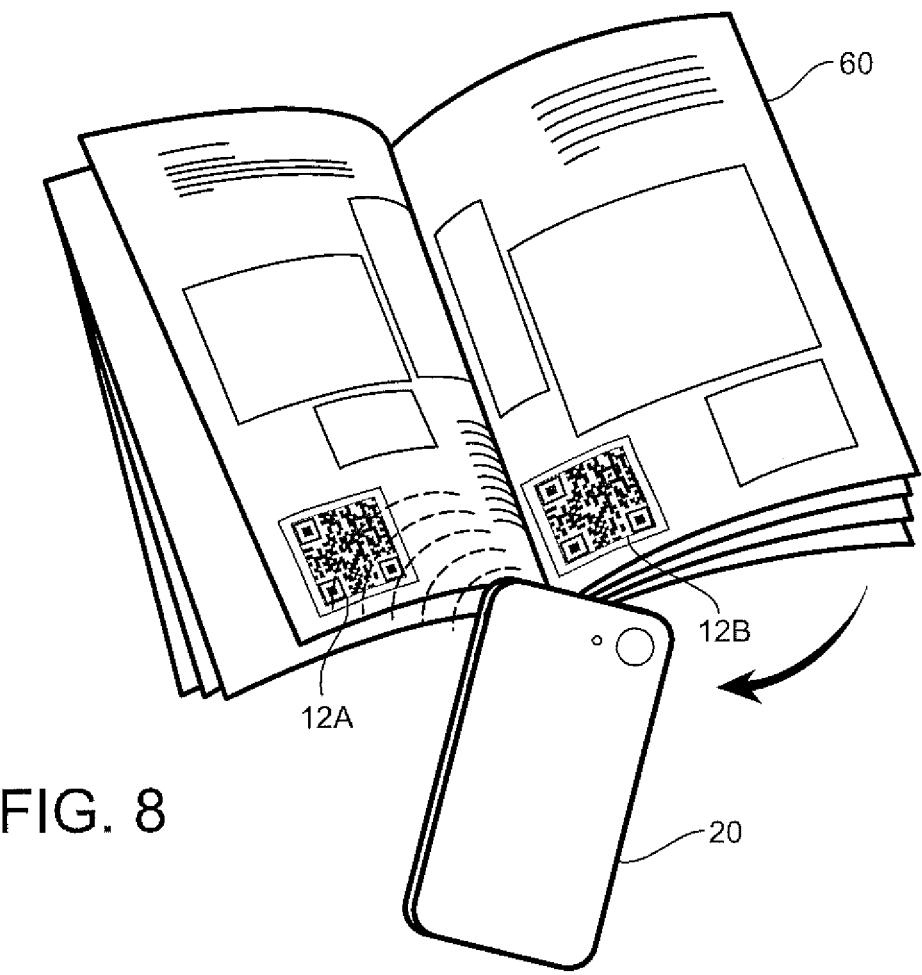
FIG. 8 illustrates the book from FIG. 7 being scanned by a digital device.

FIGS. 7 and 8 show an alternative embodiment of the bar code 12A, 12B printed on each page of a book 60. This example can be used in many situations. A visually-impaired individual can scan the bar code 12A, 12B on each page to listen to the book 60 being read to them. A parent or grandparent can record themselves reading the book 60 for a child or grandchild to scan and listen at a later date. This example could also be useful in an educational environment with communication between students and teachers. This embodiment is not limited to books 60. Magazines, journals, newspapers, comic books, and many other alternatives can have bar codes 12 on one or more pages.

As described above the method is "dynamic" because the content of the URL accessed by the scanner is solely within the control of the one or more users having access to the sticker 10 or sticker 30 with the unique bar code. The system operates in real time because of the ability to use bar codes, such as QR codes, with a digital device such as a smart phone to communicate by either adding to or overwriting previous messages via the QR code essentially at the speed of the Internet without involvement of third parties.

The features explained above contain unconventional and non-generic combination of elements, for example the bar code 12 and tactile objects. These limitations confine any abstract ideas to a particular, practical application of the ideas contained in this application, and as explained in the specification, the combination of limitations is not well-understood, conventional or routine activity.

A product and method for providing the ability to dynamically load digital data in real time according to the invention have been described with reference to specific embodiments and examples. Various details' of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

I claim:

1. A product enabling creation and placement of a unique image code encoding a unique URL pointing to an available data storage space initially housing no content and enabling a user quickly to upload, store, and access digital content for later retrieval while bypassing a need for additional Internet presence by the user, comprising:
    (a) a digital data store capable of storing digital content which can be accessed remotely over the Internet by unique URL, the data store including data storage space available for receiving and storing digital data;
    (b) an image code positioned on an object and encoding a link comprising a unique URL pointing to an Internet address of the available data storage space and configured to be optically scanned by a scanning device and communicate the unique URL to the scanning device;
    (c) a first digital scanning device adapted to execute an application including directions configured to cause the first digital scanning device to:
        (i) optically scan the image code;
        (ii) decode the image code to determine the link and the unique URL pointing to the Internet address of the available data storage space; and
        (iii) access the Internet address of the available data storage space for uploading digital content to the data storage space without storing the digital content on the first digital scanning device;
    (d) a second digital scanning device adapted to execute the application including directions configured to cause the second digital scanning device to:
        (i) optically scan the image code;
        (ii) decode the image code to determine the link and the unique URL pointing to the Internet address of the available data storage space; and
        (iii) access the Internet address of the data storage space;
        (iv) retrieve the uploaded digital content from the Internet address of the data storage space;
        (v) present the uploaded digital content to the user; and
        (vi) upload and sequentially add new digital content to the data storage space using the Internet address of the data storage space without storing the digital content on the first digital scanning device; and
    (e) whereby the first and second digital scanning devices alternate scanning the unchanging image code to access the unique URL pointing to the data storage space for progressively uploading and sequentially adding digital content to the data storage space, and receiving digital content for communicating information.

2. A product according to claim 1, wherein the digital content comprises data selected from the group consisting of audio, video, and text.

3. A product according to claim 1, wherein the image code comprises a tactile device for being touch-sensed.

4. A product according to claim 1, wherein the link to the data store comprises an internet-accessible URL.

5. A product according to claim 1, wherein either the first digital scanning device or the second digital scanning device are enabled to remove the digital content and upload additional digital content in the data storage space.

6. A product according to claim 1, wherein the uploaded digital content is automatically erased from the data storage space when new digital content is uploaded to the data storage space.

7. A product according to claim 1, wherein the digital content includes a plurality of digital items.

8. A product according to claim 1, wherein the object comprises a sticker, a label, or a printed cardstock.

9. A product according to claim 1, wherein the image code comprises a barcode or a quick response (QR) code.

10. A product according to claim 1, further comprising a second image code positioned on a second object and encoding the link to the available data storage space.

11. A method for enabling creation and placement of a unique image code encoding a unique URL pointing to an available data storage space initially housing no content and enabling a user quickly to upload, store, and access digital content to be stored for later retrieval while bypassing a need for additional Internet presence by the user via the Internet, comprising the steps of:
   (a) providing a digital data store capable of storing digital content which can be accessed remotely over the Internet by unique URL, the data store including data storage space available for receiving and storing digital data;
   (b) providing an image code for being positioned on an object and for encoding a link comprising a unique URL pointing to an Internet address of the available data storage space and configured to be optically scanned by a scanning device and communicate the unique URL to the scanning device;
   (c) providing a first digital scanning device adapted to execute an application including directions configured to cause the second digital scanning device to;
   (d) optically scan the image code;
   (e) decode the image code to determine the link and the unique URL pointing to the Internet address of the available data storage space;
   (f) access the Internet address of the available data storage space for uploading digital content to the data storage space without storing the digital content on the first digital scanning device;
   (g) providing a second digital scanning device adapted to execute an application including directions configured to cause the second digital scanning device to:
   (h) optically scan the image code;
   (i) decode the image code to determine the link and the unique URL pointing to the Internet address of the available data storage space;
   (j) access the Internet address of the data storage space;
   (k) retrieve the uploaded digital content from the Internet address of the data storage space;
   (l) present the uploaded digital content to the user; and
   (m) upload and sequentially add new digital content to the data storage space using the Internet address of the data storage space without storing the digital content on the first digital scanning device;
   (n) whereby the first and second digital scanning devices alternate scanning the unchanging image code to access the unique URL pointing to the data storage space for progressively uploading and sequentially adding digital content to the data storage space, and receiving digital content for communicating information.

12. A method according to claim 11, and including the steps of:
   (a) recording new content into the recording application of the second digital scanning device;
   (b) transferring the object to the first user;
   (c) scanning the bar code by the first user with the first digital scanning device; and
   (d) the first user accessing the recorded new content.

13. A method according to claim 12, wherein the steps of scanning the image code and accessing the content by the first and second users is repeated a plurality of times.

14. A method according to claim 12, and including the step of erasing the recorded content after use by the first or second users.

15. A method according to claim 12, and including the step of storing a plurality of transmitted messages wherein each item of recorded content is linked to a previous recording and stored.

16. A method according to claim 12, wherein the step of recording content includes the step of recording audio, text or video in digital form.

17. A system enabling creation and placement of a unique image code encoding a unique URL pointing to an available data storage space initially housing no content and enabling a user quickly to upload, store, and access digital content to be stored for later retrieval while bypassing a need for additional Internet presence by the user, the system comprising:
   (a) a digital data store capable of storing digital content which can be accessed remotely over the Internet by unique URL, the data store including data storage space available for receiving and storing digital data;
   (b) an image code positioned on an object and encoding a link comprising a unique URL pointing to an Internet address of the available data storage space and configured to be optically scanned by a scanning device and communicate the unique URL to the scanning device;
   (c) a first digital scanning device adapted to execute an application including directions configured to cause the first digital scanning device to:
      (i) optically scan the image code;
      (ii) decode the image code to determine the link and the unique URL pointing to the Internet address of the available data storage space; and
      (iii) access the Internet address of the available data storage space for uploading digital content to the data storage space without storing the digital content on the first digital scanning device;
   (d) a second digital scanning device adapted to execute the application including directions configured to cause the second digital scanning device to:
      (i) optically scan the image code;
      (ii) decode the image code to determine the link and the unique URL pointing to the Internet address of the available data storage space; and
      (iii) access the Internet address of the data storage space; for receiving
      (iv) retrieve the uploaded digital content from the Internet address of the data storage space;
      (v) present the uploaded digital content to the user; and
      (vi) upload and sequentially add new digital content to the data storage space using the Internet address of the data storage space without storing the digital content on the first digital scanning device; and (e) whereby the first and second digital scanning devices alternate scanning the unchanging image code to access the unique URL pointing to the data storage space for progressively uploading and sequentially adding digital content to the data storage space, and receiving digital content for communicating information.

18. The system of claim 17, further comprising a second image code positioned on a second object, (a) wherein the second image code comprises a second encoded link to the location of the data storage space; and (b) wherein the first digital scanning device and the second digital scanning device are adapted to optically scan the second image code, decode the second image code, thereby determining the second link, transmit the second link to the data storage space, thereby accessing the location of the data storage space, download the digital content from the location of the data storage spacer, and upload second digital content to the location of the data storage space.

* * * * *